(12) United States Patent
Takeuchi

(10) Patent No.: US 10,778,894 B2
(45) Date of Patent: Sep. 15, 2020

(54) IMAGING APPARATUS AND CONTROL METHOD FOR THE SAME

(71) Applicant: CANON KABUSHIKI KAISHA, Tokyo (JP)

(72) Inventor: Kenji Takeuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 16/100,419

(22) Filed: Aug. 10, 2018

(65) Prior Publication Data

US 2019/0052811 A1 Feb. 14, 2019

(30) Foreign Application Priority Data

Aug. 14, 2017 (JP) ................................. 2017-156521

(51) Int. Cl.
| | |
|---|---|
| *H04N 5/232* | (2006.01) |
| *H04N 5/235* | (2006.01) |
| *G02B 15/15* | (2006.01) |
| *H04N 19/139* | (2014.01) |
| *G02B 7/09* | (2006.01) |
| *G06T 5/00* | (2006.01) |

(52) U.S. Cl.
CPC ........... *H04N 5/23267* (2013.01); *G02B 7/09* (2013.01); *G02B 15/155* (2013.01); *G06T 5/003* (2013.01);
(Continued)

(58) Field of Classification Search
CPC ............. H04N 5/23267; H04N 19/139; H04N 5/2353; H04N 5/2329; H04N 5/232;
(Continued)

(56) References Cited

U.S. PATENT DOCUMENTS

2005/0018051 A1* 1/2005 Tomita ............... H04N 5/23248
348/208.4
2006/0017814 A1 1/2006 Pinto
(Continued)

FOREIGN PATENT DOCUMENTS

CN 102243756 A 11/2011
CN 102693538 A 9/2012
(Continued)

OTHER PUBLICATIONS

The above patent documents were cited in a European Partial Search Report dated May 28, 2019 which is enclosed, that issued in the corresponding European Patent Application No. 18188178.0.
(Continued)

*Primary Examiner* — Nhan T Tran
(74) *Attorney, Agent, or Firm* — Cowan, Liebowitz & Latman, P.C.

(57) ABSTRACT

In an imaging apparatus, a first motion vector detector calculates a first motion vector on the basis of images with a low spatial resolution and a second motion vector detector calculates a second motion vector on the basis of images with a high spatial resolution. A first control amount having a great weight for information with a low frequency resolution with respect to frequency components of the first motion vector information and a second control amount having a great weight for information with a high frequency resolution with respect to frequency components of the second motion vector information are calculated. A third control amount is calculated through multiplication by a predetermined weight regardless of the frequency resolution with respect to frequency components of the first or second motion vector information. Drive control of an image blur correction lens is performed according to the first to third control amounts.

23 Claims, 16 Drawing Sheets

(52) U.S. Cl.
CPC .......... *H04N 5/232* (2013.01); *H04N 5/2329* (2013.01); *H04N 5/2353* (2013.01); *H04N 5/23254* (2013.01); *H04N 5/23287* (2013.01); *H04N 19/139* (2014.11); *G06T 2207/20201* (2013.01)

(58) Field of Classification Search
CPC .......... H04N 5/23287; H04N 5/23254; H04N 5/23258; G02B 7/09; G02B 15/155; G06T 5/003; G06T 2207/20201
See application file for complete search history.

(56) References Cited

U.S. PATENT DOCUMENTS

| | | | | |
|---|---|---|---|---|
| 2006/0066728 | A1* | 3/2006 | Batur | .................. G06T 7/20 348/208.99 |
| 2007/0183765 | A1 | 8/2007 | Imamura | |
| 2016/0234440 | A1* | 8/2016 | Lee | .................. H04N 5/23258 |
| 2016/0260227 | A1* | 9/2016 | Narita | .................. G06T 7/207 |
| 2017/0069104 | A1* | 3/2017 | Uekusa | .................. G06T 7/55 |

FOREIGN PATENT DOCUMENTS

| | | |
|---|---|---|
| JP | 2010-136036 A | 6/2010 |
| JP | 2015-057670 A | 3/2015 |

OTHER PUBLICATIONS

The above patent documents were cited in a European Partial Search Report dated Jan. 21, 2019, which is enclosed, that issued in the corresponding European Patent Application No. 18188178.0.

The above patent documents were cited in a Chinese Office Action dated Jul. 3, 2020 a copy of which is enclosed, with English translation that issued in the corresponding Chinese Application No. 201810922604.X.

* cited by examiner

IMAGING APPARATUS AND CONTROL METHOD FOR THE SAME

BACKGROUND OF THE INVENTION

Field of the Invention

The present invention relates to an imaging apparatus that corrects image blur of images and a control method for the same.

Description of the Related Art

The influence of shake such as camera shake on images becomes significant when the size of an imaging apparatus decreases and the magnification of optical systems increases. Thus, image blur correcting functions are important. There is a method of detecting shake applied to an imaging apparatus using an angular velocity sensor such as a gyro sensor. Alternatively, there is a method of detecting motion vectors from deviations of a plurality of images. In the latter method, in general, a captured image is compared with an image one frame earlier than the captured image and the amount of shake of the imaging apparatus is calculated from the amount of movement of a representative point (a motion vector). Motion vector calculation processing involves a time delay of at least one frame due to the influence of image signal accumulation and reading times, an image matching time, or the like.

In the optical image blur correction, image blur correction is performed by driving an image blur correction member such as a shift lens, and drive control of the image blur correction member is performed by a feedback control system. Therefore, in the control based on shake information using motion vectors, a detection time delay of motion vectors is equivalent to adding a phase delay element to the feedback control system. This may degrade image blur correction performance or make the feedback control system unstable depending on control frequency, bringing it into an oscillation state.

In a technology disclosed in Japanese Patent Laid-Open No. 2015-57670, only high frequency components superimposed on motion vectors can be attenuated by controlling the current motion amounts according to differences in motion amounts detected in the past. Thus, it is possible to increase the correction gain while securing the stability of the feedback control system by attenuating signal components of a frequency band including noise components such as detection errors of motion vectors and a frequency band which may cause oscillation.

However, in the technology disclosed in Japanese Patent Laid-Open No. 2015-57670, it is assumed that noise components superimposed on the motion vector are high frequency components above a predetermined frequency. The performance of noise reduction depends on what is set for the time count value until inversion of the sign of the motion vector. In addition, if relatively great noise is always superimposed on shake components of the imaging apparatus detected by motion vectors, it is difficult to accurately separate the noise from the shake components of the imaging apparatus. As a result, the feedback control system may become unstable due to the influence of high frequency noise.

A fundamental solution to the problem is to acquire a highly accurate motion vector with little noise in a short time without delay. In the related art, a method of adding an arithmetic circuit for matching, which entails circuit costs, and a method of reducing the resolution of images to be used for matching to a low resolution to decrease the amount of calculation or the like have been employed to speed up the matching processing of motion vectors. However, motion vector information acquired from low-resolution images has low accuracy and resolution and there is a trade-off relationship between the time delay of motion vector detection and the accuracy of detection.

SUMMARY OF THE INVENTION

The present invention improves an image blur correction function by using a plurality of pieces of motion vector information calculated from a plurality of images having different image sizes.

An imaging apparatus according to an embodiment of the present invention is provided that includes at least one processor and at least one memory functioning as: a generation unit configured to generate a first image having a first resolution and a second image having a second resolution different from the first resolution on the basis of an input image; a first detection unit configured to detect first motion vector information on the basis of a plurality of the first images generated by the generation unit; a second detection unit configured to detect second motion vector information on the basis of a plurality of the second images generated by the generation unit; and a calculation unit configured to calculate a control amount for a correction unit on the basis of the first motion vector information and the second motion vector information.

According to the imaging apparatus of the present invention, it is possible to improve the image blur correction performance by using a plurality of pieces of motion vector information calculated from a plurality of images having different image sizes.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings. In each embodiment, an example of a digital camera will be described as an imaging apparatus having an image blur correction function. The imaging apparatus may have a moving image shooting function.

First Embodiment

Figure 1:
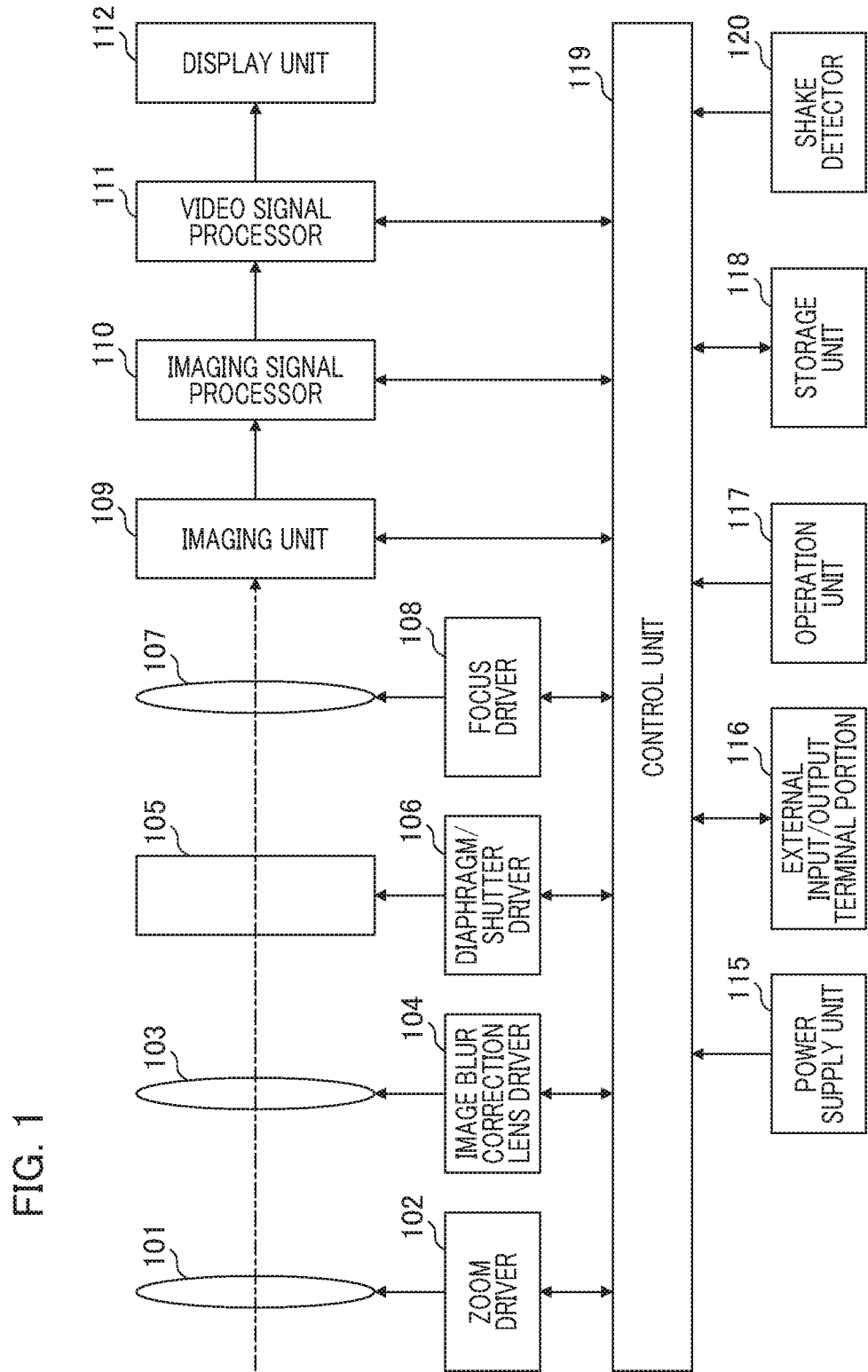
FIG. 1 is a block diagram illustrating an example configuration of an imaging apparatus according to an embodiment of the present invention.

FIG. 1 is a block diagram showing a schematic configuration of an imaging apparatus according to the present embodiment. A zoom lens 101 is a movable lens that is a constituent element of an imaging optical system. A zoom driver 102 performs drive control of the zoom lens 101 according to a control command from a control unit 119. Focal length is changed by moving the zoom lens 101 in the direction of the optical axis of the imaging optical system. An image blur correction lens 103 (hereinafter simply referred to as a correction lens) is a correction member that is movable in a direction perpendicular to the optical axis of the imaging optical system. An image blur correction lens driver 104 performs drive control of the correction lens 103. A diaphragm/shutter unit 105 is a mechanical shutter having a diaphragm function. A diaphragm/shutter driver 106 drives the diaphragm/shutter unit 105 according to a control command from the control unit 119. A focus lens 107 is a movable lens that is a constituent element of the imaging optical system and can be moved back and forth in the direction of the optical axis of the imaging optical system. A focus driver 108 drives the focus lens 107 according to a control command from the control unit 119.

An imaging unit 109 photoelectrically converts an optical image of a subject, which is incident on the imaging unit 109 via the imaging optical system, into an electric signal through an imaging element. The imaging element is a charge coupled device (CCD) image sensor, a complementary metal oxide semiconductor (CMOS) image sensor, or the like. An imaging signal processor 110 performs predetermined processing such as A/D conversion, correlated double sampling, gamma correction, white balance correction, or color interpolation processing on the electric signal output by the imaging unit 109 to convert the electric signal into a video signal. A video signal processor 111 processes the video signal output by the imaging signal processor 110 according to application. Specifically, the video signal processor 111 performs processing such as generation of a video signal for display, encoding for recording, or conversion to a data file.

A display unit 112 performs image display on the basis of the video signal for display output by the video signal processor 111. A power supply unit 115 supplies power to each part of the imaging apparatus according to application. An external input/output terminal portion 116 is used to receive and output a communication signal and a video signal from and to an external device. An operation unit 117 includes buttons, switches, and the like for the user to issue operation instructions. For example, the operation unit 117 has a release switch configured such that a first switch (SW1) and a second switch (SW2) are sequentially turned on in accordance with the amount of pushing. The first switch SW1 is turned on when the release button is pressed halfway and the second switch SW2 is turned on when the release button is fully pressed. A storage unit 118 stores a variety of data including a video signal.

The control unit 119 performs overall control of the imaging apparatus and includes a central processing unit (CPU), a read only memory (ROM), a random access memory (RAM), or the like. The CPU controls each part of the imaging apparatus and performs processing to be described below by developing and executing a control program stored in the ROM on the RAM. The control unit 119 also performs automatic exposure (AE) processing for determining a shutter speed and an aperture value for obtaining an appropriate amount of exposure on the basis of luminance information of the video signal and a predetermined program chart.

When the user operates the release button to turn on the first switch SW1, the control unit 119 calculates an autofocus (AF) evaluation value. The calculation of the AF evaluation value is performed on the basis of the video signal for display that the video signal processor 111 outputs to the display unit 112. The control unit 119 controls the focus driver 108 on the basis of the calculated AF evaluation value to perform autofocusing. When the user further presses the release button to turn on the second switch SW2, the control unit 119 performs a shooting process with the determined aperture value and shutter speed. Here, the electric signal read from the imaging element of the imaging unit 109 is processed, and a process of storing the video signal acquired through imaging in the storage unit 118 is performed.

The operation unit 117 has an image blur correction switch that enables selection of on/off of a image blur correction mode. When the image blur correction mode is set to on by operating the image blur correction switch, the control unit 119 instructs the image blur correction lens driver 104 to perform an image blur correction operation. Upon receiving this instruction, the image blur correction lens driver 104 performs the image blur correction operation until an instruction to turn off the image blur correction operation is issued. The operation unit 117 also has a shooting mode selection switch that enables selection of a still image shooting mode and a moving image shooting mode. When the user selects a desired shooting mode by operating the shooting mode selection switch, the control unit 119 changes the operation condition of the image blur correction lens driver 104 according to the selected shooting mode. Further, the operation unit 117 has a reproduction mode selection switch for selecting a reproduction mode. When the reproduction mode is selected by operating the reproduction mode selection switch, the control unit 119 stops the image blur correction operation. The operation unit 117 also has a magnification change switch for issuing an instruction to change zoom magnification. When an instruction to change the zoom magnification is issued by operating the magnification change switch, the zoom driver 102, which has received the instruction from the control unit 119, drives the zoom lens 101 to move the zoom lens 101 to the instructed zoom position.

The shake detector 120 detects shake of the imaging apparatus and outputs a shake detection signal to the control unit 119. The shake detector 120 includes, for example, an angular velocity sensor and detects an angular velocity of the shake of the imaging apparatus.

Figure 2A:
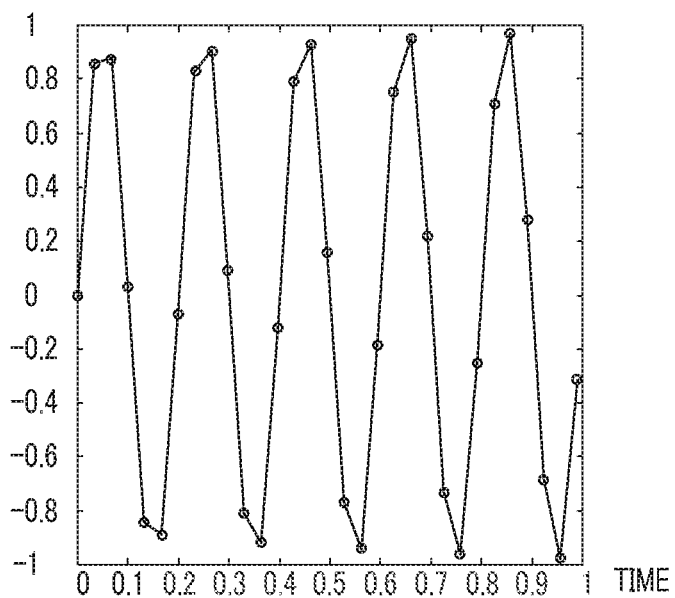
FIGS. 2A and 2B are diagrams illustrating the frequency resolution of shake information according to an embodiment of the present invention.
Figure 2B:
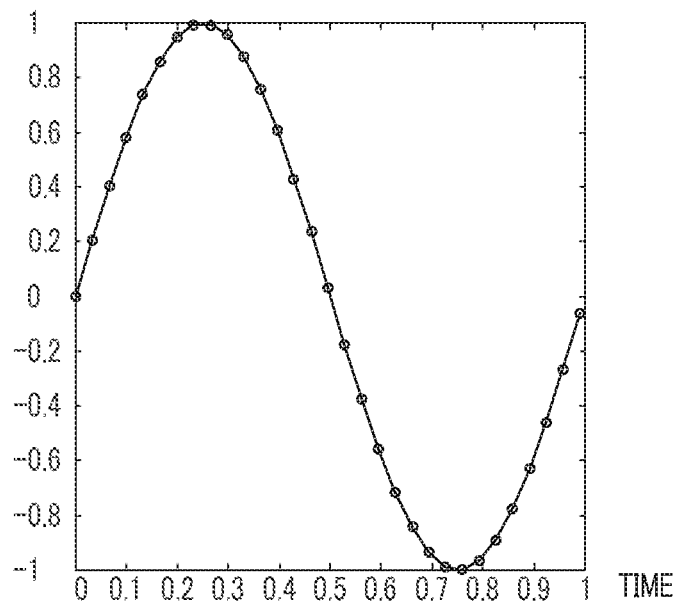

Next, frequency resolution relating to shake information of the imaging apparatus will be described with reference to FIGS. 2A and 2B. FIG. 2A illustrates shake information with a low frequency resolution and FIG. 2B illustrates shake information with a high frequency resolution. FIGS. 2A and 2B each show shake information of a single frequency, where the horizontal axis represents time and the vertical axis represents the amplitude of shake. Although the shake information is represented with a single frequency for simplicity of explanation, actual shake is often a mixture of a plurality of frequency components. If shake applied to an imaging apparatus is detected using a motion vector, generally, a captured image is compared with an image one or more frames earlier and the amount of movement of its representative point is assumed as the amount of shake of the imaging apparatus. Therefore, the sampling time for detecting the shake information is determined according to the frame rate of images. For example, the sampling time is about 0.033 ms if the frame rate of images is 30 frames per second (fps).

FIG. 2A shows an example in which a signal change of the shake information within a certain time is great. In this example, the shake is that of 5 cycles per second (5 Hz). If shake is detected using a motion vector at a frame rate of 30 fps, it is detected with 6 sampling points for one cycle. On the other hand, FIG. 2B shows an example in which a signal change of the shake information within a certain time is small. In this example, the shake is that of 1 cycle per second (1 Hz). If shake is detected using a motion vector at a frame rate of 30 fps, it is detected with 30 sampling points for one cycle. Detection of a signal change of one cycle at the frequency of the shake information with a greater number of sampling points gives a higher reproducibility of the shake information. From this fact, it is defined that the shake information of FIG. 2A is lower in frequency resolution than the shake information of FIG. 2B. In other words, the shake information of FIG. 2B has a higher frequency resolution than the shake information of FIG. 2A.

Figure 3:
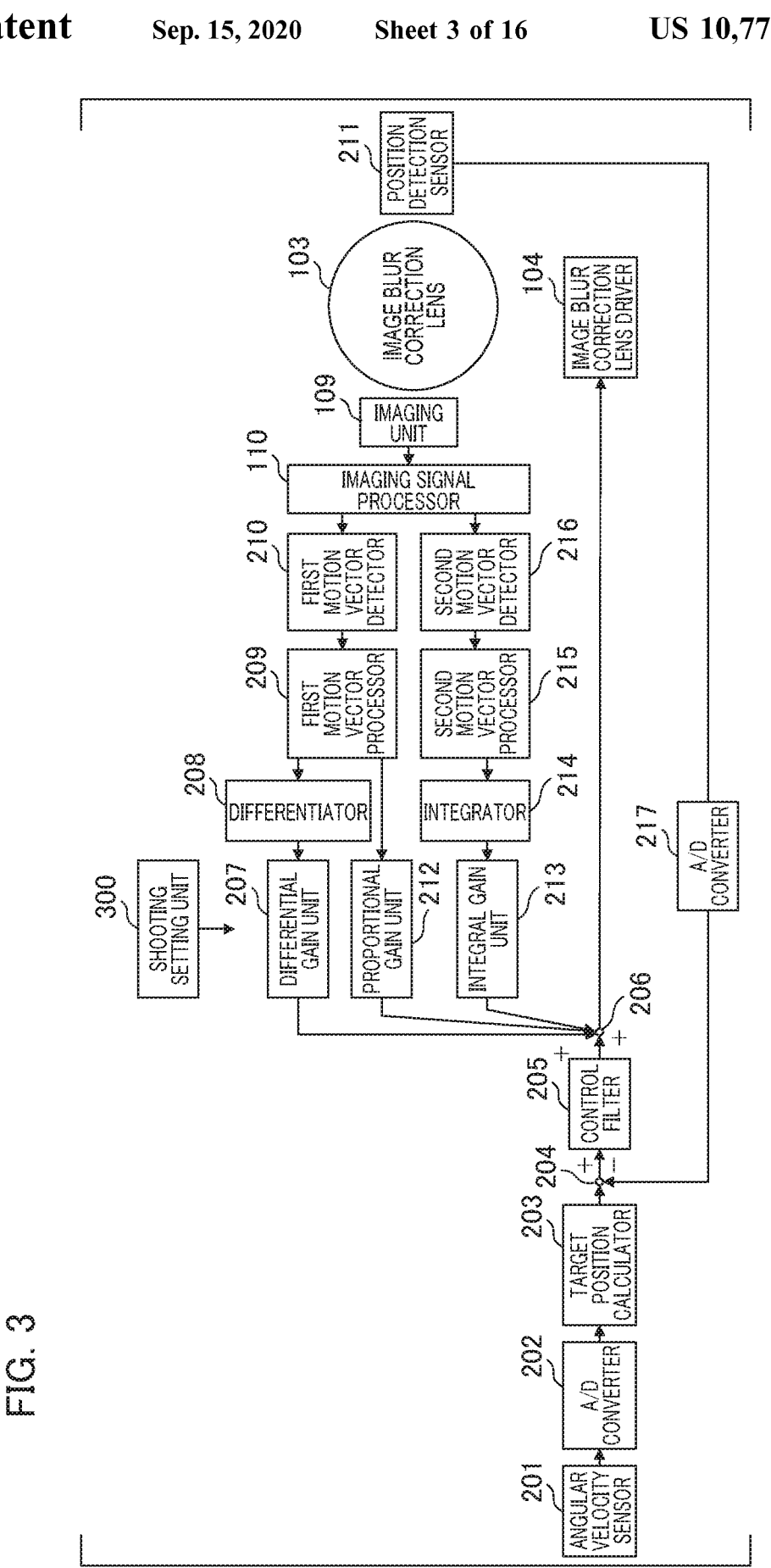
FIG. 3 is a block diagram illustrating an example configuration of an image blur correction control unit according to a first embodiment.

FIG. 3 is a block diagram showing an example configuration of the image blur correction control unit of the imaging apparatus. An angular velocity sensor 201 is an example of the shake detection unit that detects shake of the imaging apparatus. An A/D converter 202 acquires an angular velocity detection signal from the angular velocity sensor 201 and converts it into a digital signal. A target position calculator 203 calculates a control target position of the correction lens 103 on the basis of the output of the A/D converter 202 and outputs the calculated control target position to a subtractor 204.

A position detection sensor 211 detects the position of the correction lens 103 and outputs a position detection signal to the A/D converter 217. The A/D converter 217 converts the position detection signal of the correction lens 103 into a digital signal and outputs the digital signal to the subtractor 204. The subtractor 204 subtracts the output of the A/D converter 217 from the output of the target position calculator 203 and outputs the subtraction result to a control filter 205. The control filter 205 performs predetermined filter calculation on the subtraction result and outputs the resulting signal to the adder 206.

On the other hand, the image signal acquired by the imaging unit 109 is processed by the imaging signal processor 110 and output to a first motion vector detector 210 and a second motion vector detector 216. These motion vector detectors detect motion vectors from image data of different image sizes. The first motion vector processor 209 processes motion vectors detected by the first motion vector detector 210 and the second motion vector processor 215 processes motion vectors detected by the second motion vector detector 216.

A differentiator 208 time-differentiates first motion vector information calculated by the first motion vector processor 209 and a differential gain unit 207 multiplies the output of the differentiator 208 by a predetermined factor. Further, a proportional gain unit 212 multiplies the first motion vector information by a predetermined factor.

The integrator 214 integrates second motion vector information calculated by the second motion vector processor 215 over a predetermined time. Further, an integral gain unit 213 multiplies the output of the integrator 214 by a predetermined factor.

The gain values of the differential gain unit 207, the proportional gain unit 212, and the integral gain unit 213 are changed according to shooting setting information of the shooting setting unit 300. The shooting setting unit 300 acquires the shooting setting information of the imaging apparatus according to the operation unit 117. The outputs of the differential gain unit 207, the proportional gain unit 212, and the integral gain unit 213 are sent to an adder 206 where they are added to the output of the control filter 205. The image blur correction lens driver 104 drives the correction lens 103 according to the output of the adder 206.

Figure 4:
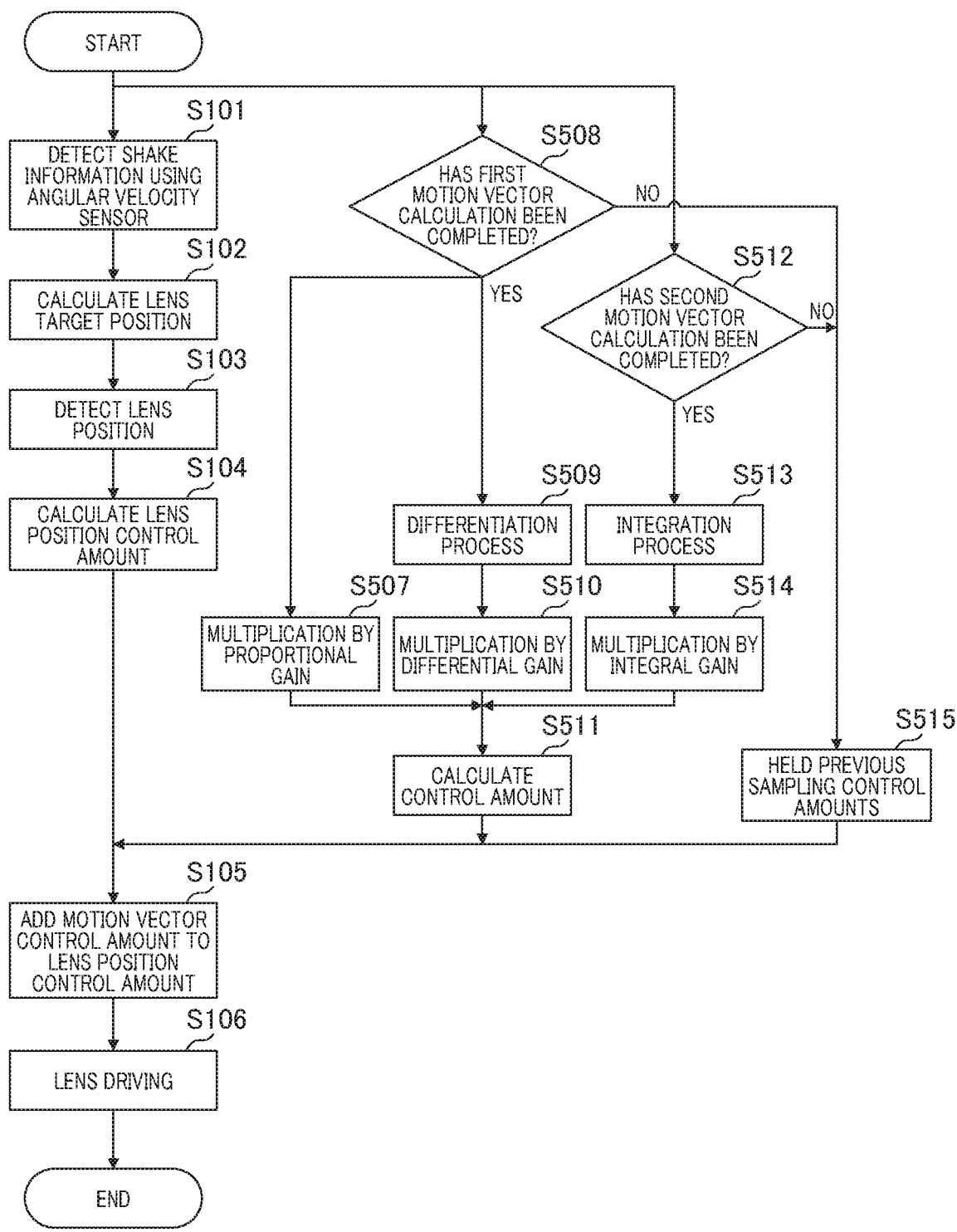
FIG. 4 is a flowchart illustrating an image blur correction control operation according to the first embodiment.
Figure 5:
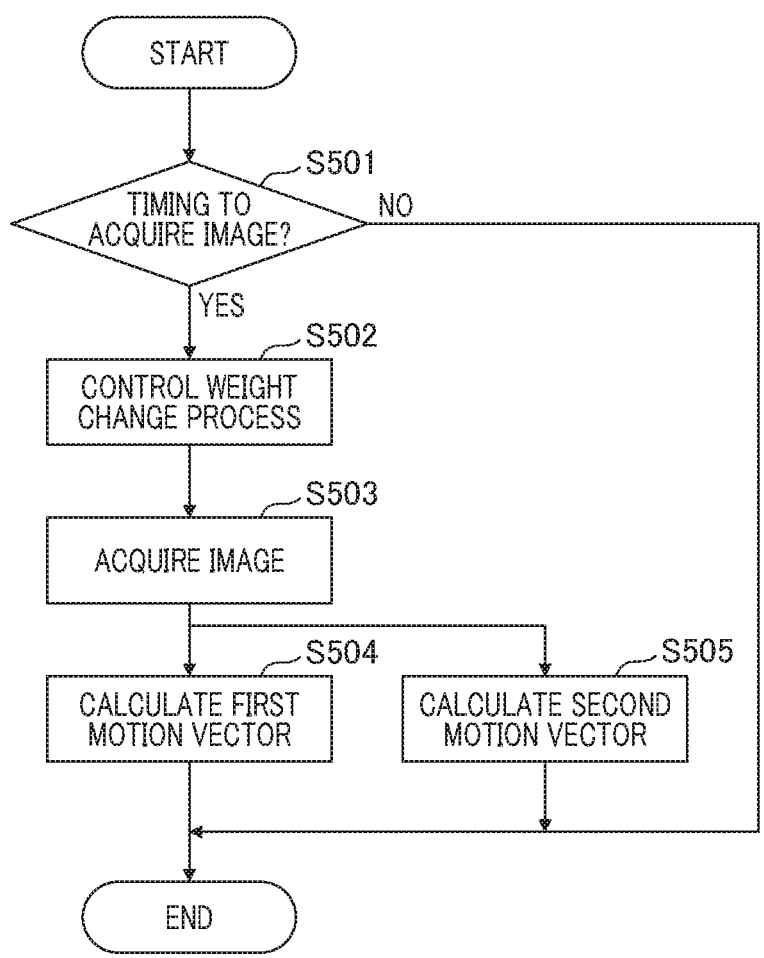
FIG. 5 is a flowchart illustrating a motion vector calculation process.

The image blur correction operation of the correction lens 103 will now be described in detail with reference to flowcharts of FIGS. 4 and 5. Processing shown in the flowchart of FIG. 4 is repeatedly performed at a predetermined sampling cycle. FIG. 5 is a flowchart illustrating a motion vector calculation process, which is repeatedly performed at a cycle corresponding to the frame rate of images.

A first process including steps S101 to S104 and a second process including steps S508 to S515 in FIG. 4 are performed as parallel processes. First, the first process will be described.

The processing of FIG. 4 starts. In step S101, the angular velocity sensor 201 detects overall shake of the imaging apparatus due to camera shake or the like. The detected shake information is converted into an electric signal, and the A/D converter 202 converts the electric signal from an analog signal to a digital signal. Next, in step S102, the target position calculator 203 calculates a control target position of the correction lens 103. Here, computation for canceling the camera shake or the like from the shake information detected in step S101 is performed to calculate a target position signal.

Next, in step S103, the position detection sensor 211 detects the position of the correction lens 103 and the A/D converter 217 converts the acquired position detection signal from an analog signal to a digital signal. The subtractor 204 subtracts the position detection signal detected in step S103 from the target position signal calculated in step S102. The control filter 205 calculates a feedback control amount such that the position of the correction lens 103 follows the target position (step S104).

In steps S501 to S505 shown in FIG. 5, a process of calculating motion vector information is performed in parallel with the process of acquiring the shake information. Calculation of motion vectors is performed by detecting differences in pixel positions of a plurality of images which are captured at different times using a known method. This calculation process is a process that is performed depending on the sampling time for acquiring the plurality of images, and is performed at a different sampling cycle from that when the shake information is acquired.

In step S501 of FIG. 5, the control unit 119 determines whether or not it is the timing to acquire an image. Upon determining that it is not the timing to acquire an image (No in step S501), the control unit 119 does not perform the motion vector calculation process and terminates the process. Upon determining in step S501 that it is the timing to acquire an image (Yes in step S501), the process proceeds to step S502.

In step S502, the control unit 119 performs a control weight change process according to the shooting setting made by the operation unit 117. Details of this process will be described later. In step S503, the imaging unit 109 converts an optical signal into an electric signal to acquire image information. The imaging signal processor 110 performs conversion from an analog signal to a digital signal and predetermined image processing to generate two evaluation images having different image sizes for motion vector calculation. These evaluation images are hereinafter referred to as first and second evaluation images. Subsequent to step S503, processes of steps S504 and S505 are performed in parallel.

Step S504 is a process of calculating a first motion vector. The first motion vector detector 210 and the first motion vector processor 209 compare a first evaluation image of a previous frame which is stored in the memory in advance and a first evaluation image of a current frame and calculate a first motion vector from the deviation between the images. On the other hand, step S505 is a process of calculating a second motion vector. The second motion vector detector 216 and the second motion vector processor 215 calculate a second motion vector on the basis of a second evaluation image of the previous frame and a second evaluation image of the current frame. Incidentally, a correlation method, a block matching method, or the like may be used as a method of detecting motion vectors. In the present invention, any method of calculating motion vectors may be employed.

Figure 6:
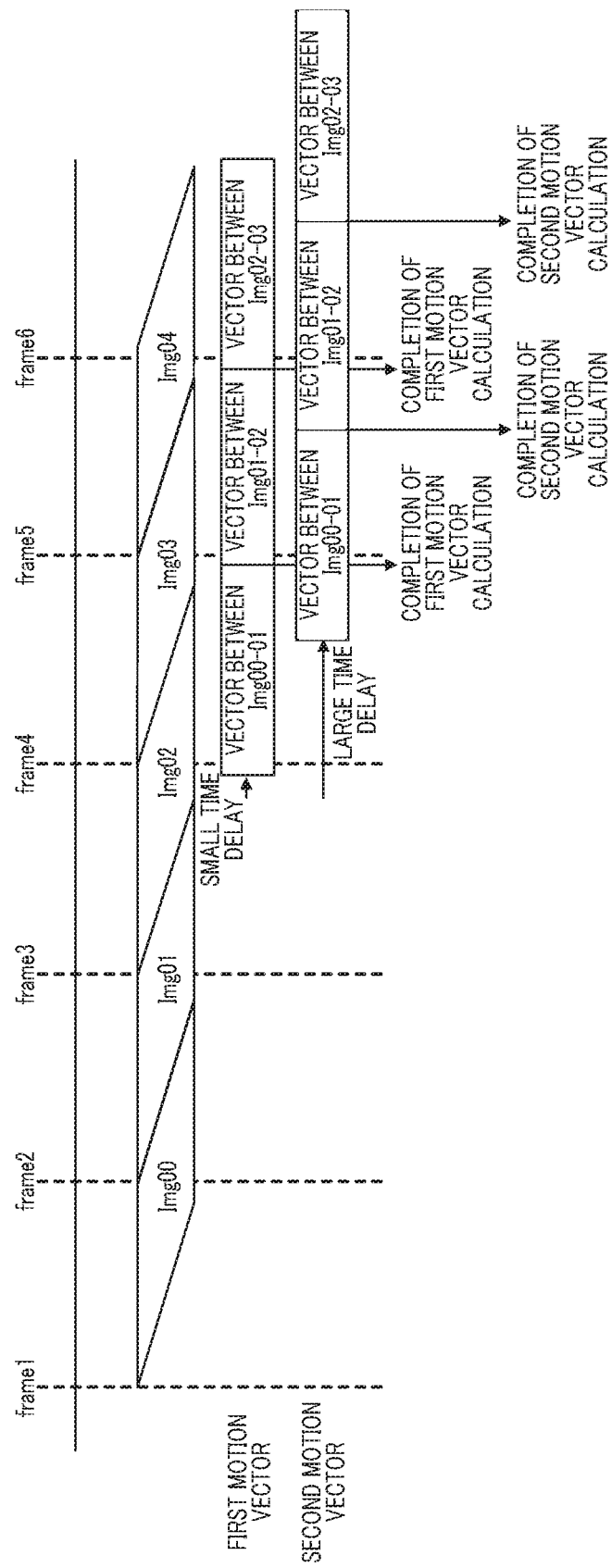
FIG. 6 is a timing chart of motion vector calculation.

Here, calculation timings of the first and second motion vectors will be described with reference to the timing chart of FIG. 6. FIG. 6 shows example acquisition of images of first to sixth frames. Portions (Img00 to Img04) shown by parallelograms in FIG. 6 represent the timing of reading data by the imaging unit 109. The direction of the time axis is from left to right in FIG. 6. The timing of calculating the first motion vector and the timing of calculating the second motion vector are also shown with respect to reading of each frame image.

Detection of each of the first and second motion vectors involves a time delay of at least one frame due to matching processing of two frame images or the like. The time required for matching processing varies depending on the image size (the number of pixels) for calculating a motion vector. That is, when a motion vector is calculated from images with a large image size, it takes a longer time than when a motion vector is calculated from images with a small image size. Hereinafter, images with different image sizes are defined as images with different spatial resolutions. Specifically, an image with a small image size is defined as an image with a low spatial resolution and an image with a large image size is defined as an image with a high spatial resolution.

In the present embodiment, it is assumed that the first evaluation image is an image with a low spatial resolution and the second evaluation image is an image with a high spatial resolution. That is, the first motion vector detector 210 processes images with a lower spatial resolution than those processed by the second motion vector detector 216. Therefore, a time delay at the timing of calculating the first motion vector is shorter than that at the timing of calculating the second motion vector. In FIG. 6, for example, when motion vectors are calculated from images Img00 and Img01 of different frames, the timing of completing calculation of the first motion vector is earlier than that of the second motion vector.

Next, the second process in FIG. 4 will be described. In step S508, the control unit 119 determines whether or not the process of calculating the first motion vector has been completed. Upon determining that the process of calculating the first motion vector has been completed (Yes in step S508), the process of step S507 and the processes of steps S509 and S510 are performed as parallel processes. Upon determining that the process of calculating the first motion vector has not been completed (No in step S508), the process proceeds to step S515.

In step S507, the proportional gain unit 212 calculates a proportional control amount by multiplying the first motion vector by a predetermined proportional gain value. Next, the process proceeds to step S511. In step S509, the differentiator 208 time-differentiates the first motion vector. In step S510, the differential gain unit 207 calculates a differential control amount by multiplying the output of the differentiator 208 by a predetermined differential gain value. Next, the process proceeds to step S511.

On the other hand, in step S512, the control unit 119 determines whether or not the process of calculating the second motion vector has been completed. Upon determining that the process of calculating the second motion vector has been completed (Yes in step S512), the process proceeds to step S513. Upon determining that the process of calculating the second motion vector has not been completed (No in step S512), the process proceeds to step S515.

In step S513, the integrator 214 time-integrates the second motion vector. In the next step S514, the integral gain unit 213 multiplies the output of the integrator 214 by a predetermined integral gain value to calculate the integral control amount. Next, the process proceeds to step S511.

If it is determined in step S508 that the process of calculating the first motion vector has not been completed or if it is determined in step S512 that the process of calculating the second motion vector has not been completed, the proportional and differential control amounts acquired in the previous sampling are held in step S515. Next, the process proceeds to step S105.

In step S511, a process of calculating a control amount is performed. As described above, the timing of completing the process of calculating the first motion vector is earlier than the timing of completing the process of calculating the second motion vector. Therefore, the timing of updating the proportional control amount and the differential control amount is earlier than the timing of updating the integral control amount. The adder 206 calculates the control amount by summing the three control amounts in step S511.

In step S105, the adder 206 adds up the position control amount for the correction lens 103 calculated in step S104 and the control amount calculated in step S511. In step S106, the image blur correction lens driver 104 drives the correction lens 103 in accordance with a control signal output from the adder 206. The correction lens 103 moves in a direction perpendicular to the shooting optical axis, thereby performing the image blur correction operation.

Figure 7A:
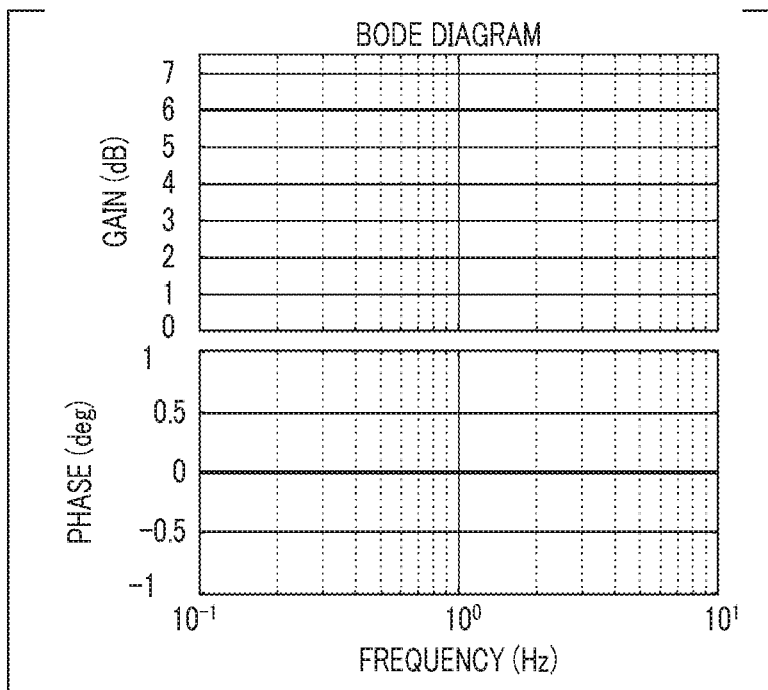
FIGS. 7A to 7D are diagrams illustrating frequency characteristics of each control element according to the first embodiment.
Figure 7B:
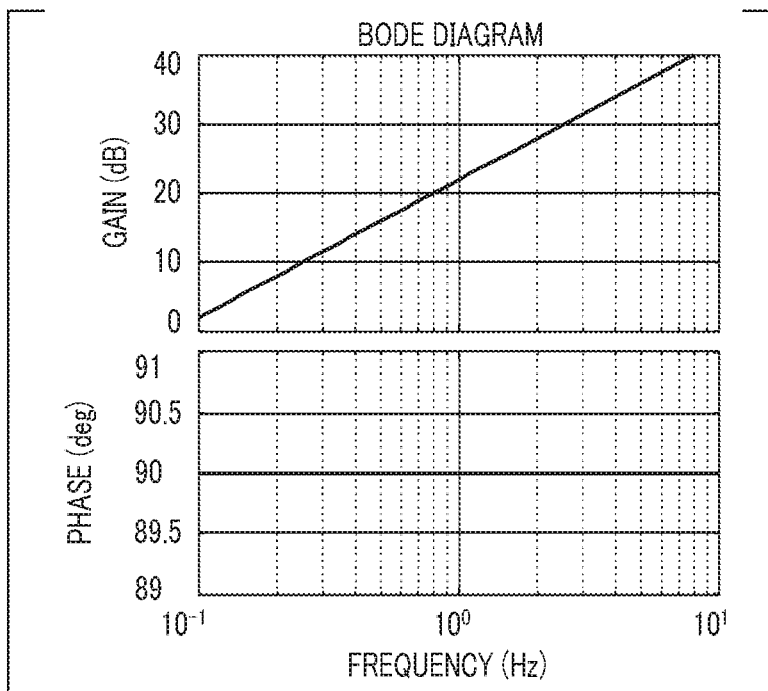
Figure 7C:
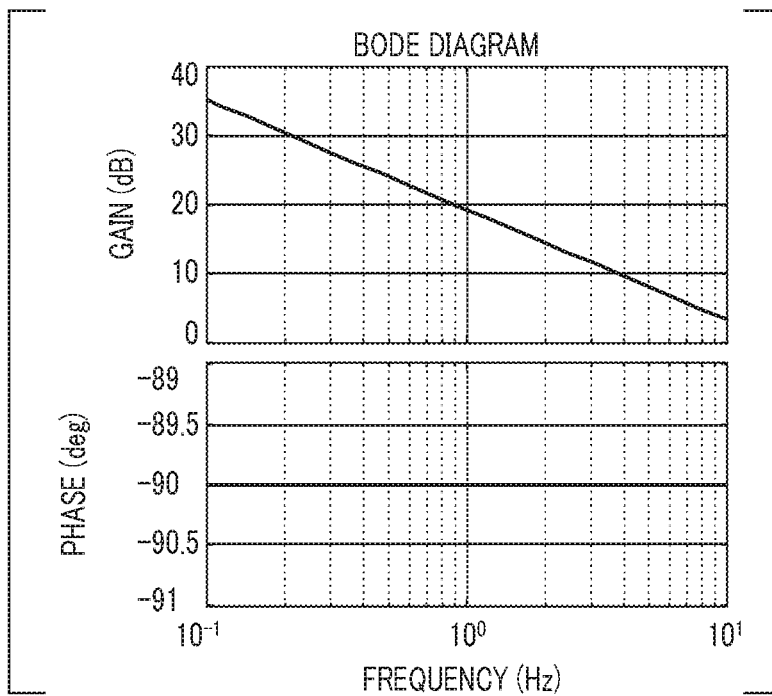
Figure 7D:
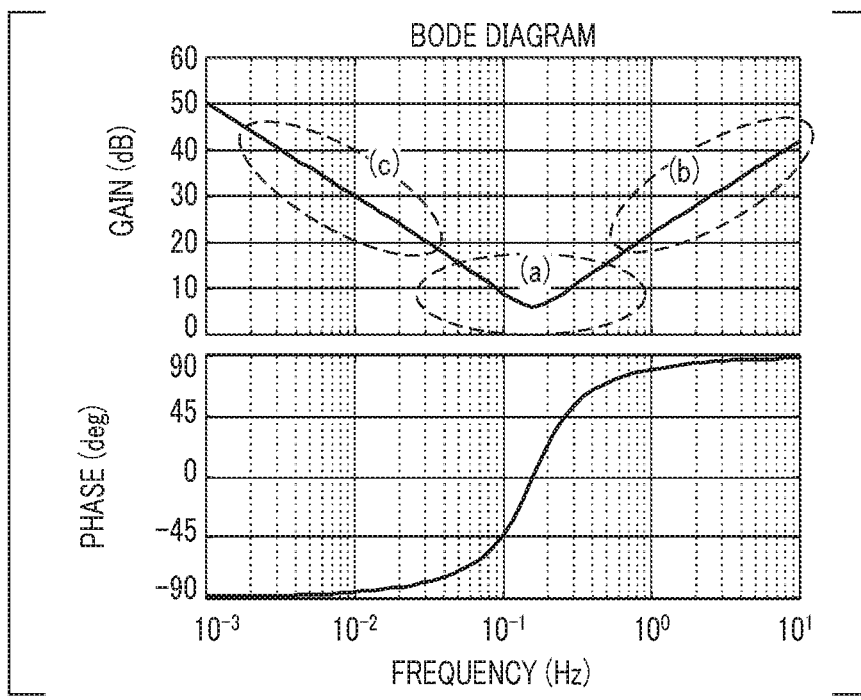

Next, advantages of the present embodiment will be described with reference to FIGS. 7A to 7D. In the present embodiment, three control amounts, that is, the differential control amount, the proportional control amount, and the integral control amount, are calculated using motion vector information calculated from images having different spatial resolutions. Advantages of performing image blur correction on the basis of these control amounts will be described below with reference to Bode diagrams of FIGS. 7A to 7D. The feedback control system based on motion vectors is a PID control system, and FIGS. 7A to 7D are diagrams showing the frequency characteristics of each control element. FIG. 7A shows the frequency characteristics of the proportional controller, FIG. 7B shows the frequency characteristics of the differential controller, and FIG. 7C shows the frequency characteristics of the integral controller. FIG. 7D shows the frequency characteristics of the PID controller including these control elements. In FIGS. 7A to 7D, gain characteristics are arranged on the upper side and phase characteristics are arranged on the lower side.

The following are the functions of each controller.

Proportional controller

This applies a manipulation amount (i.e., a manipulated variable) proportional to remaining shake, which is the residual of shake calculated by a motion vector.

Differential controller

When the amount of deviation starts to change due to disturbance or the like, this functions to make a great correction within a small deviation according to the degree of the change to prevent the control result from fluctuating greatly.

Integral controller

This functions to change the manipulation amount when an offset occurs in the deviation to eliminate a steady offset of the deviation.

In addition, the frequency characteristics (gain characteristics) of each of the controllers have the following features.

Proportional (P) control uniformly increases the control gain regardless of frequency.

Differential (D) control increases the control gain of (high frequency) components with a low frequency resolution.

Integral (I) control increases the control gain of (low frequency) components with a high frequency resolution.

The frequency characteristics of the PID controller configured by combining the above controllers are as shown in FIG. 7D and have the following features.

By integral control, it is possible to adjust the gain of the frequency domain for (low frequency) components (c) with a high frequency resolution in the shake information detected from the motion vector information.

By differential control, it is possible to adjust the gain of the frequency domain for (high frequency) components (b) with a low frequency resolution in the shake information detected from the motion vector information.

By proportional control, it is possible to adjust the gain of the whole frequency band (a) regardless of the frequency.

The first motion vector information calculated from images with a low spatial resolution has a characteristic that the detection delay time of shake information is short and the reproducibility of (high frequency) shake information with a low frequency resolution is high. Utilizing this characteristic, proportional control information and differential control information having a great contribution to the gain of components with a low frequency resolution are calculated using the first motion vector information. On the other hand, the second motion vector information calculated from images with a high spatial resolution has a characteristic that the detection delay time of shake information is long but the reproducibility of shake information of (low frequency) components with a high frequency resolution is high. Utilizing this characteristic, integral control information which has a great contribution to the gain of components with a high frequency resolution is calculated using the second motion vector information.

Processes of calculating two pieces of shake information having different frequency resolutions using motion vector information calculated from two images having different spatial resolutions and then combining control elements having different degrees of contribution to the gain with respect to shake frequency to calculate a control amount are performed as described above. This solves the problems which cannot be addressed by the method of the related art. That is, it is possible to achieve both a reduction in the calculation delay time of motion vector information and an increase in the detection accuracy of shake information with different frequency resolutions, thereby improving the image blur correction performance.

Figure 8A:
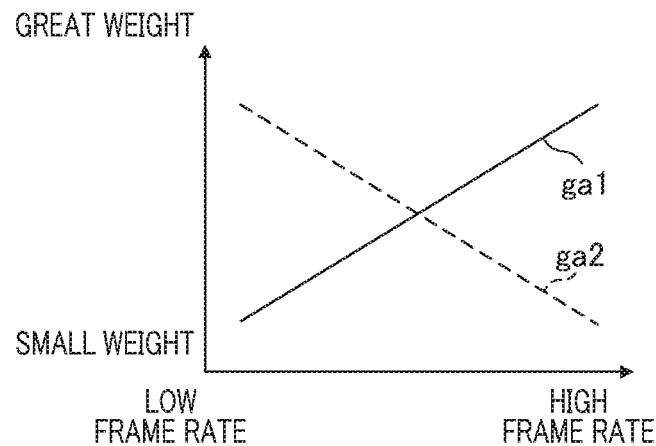
FIGS. 8A to 8C are diagrams illustrating a weight change of each control element according to the first and second embodiments.
Figure 8B:
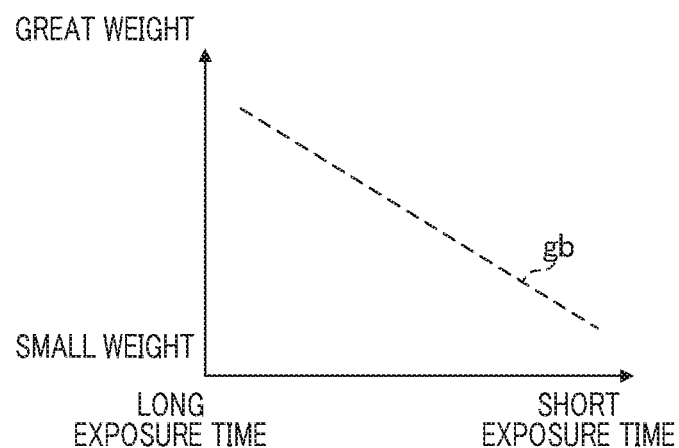
Figure 8C:
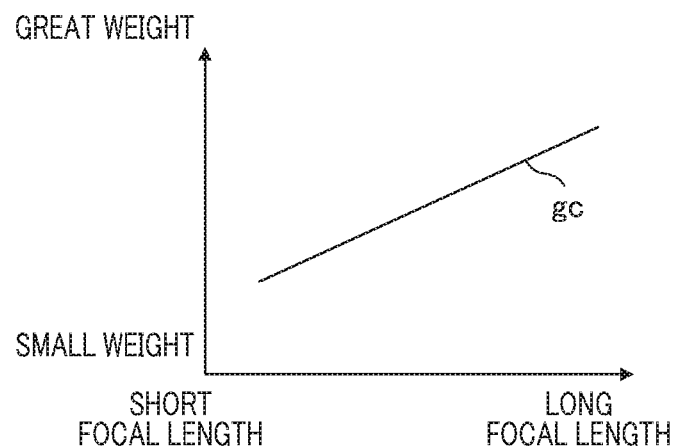

Next, the control weight change process shown in step S502 of FIG. 5 will be described with reference to FIGS. 8A to 8C. FIGS. 8A to 8C are diagrams illustrating the relationship between weight changes of the control elements with respect to the shooting setting condition. In the present embodiment, the weights of the control elements relate to the degrees of their contribution to the output of the controller. Changing the weights corresponds to changing the gain values of the differential gain unit 207, the proportional gain unit 212, and the integral gain unit 213. Specifically, increasing the weight is to increase the control gain value and decreasing the weight is to decrease the control gain value.

FIG. 8A shows a change in the weight according to the frame rate of images. The horizontal axis represents the frame rate for calculating the first and second motion vectors. The vertical axis represents the weight of each control element. A graph line representing differential control is indicated by a solid line and a graph line representing integral control is indicated by a broken line.

As indicated by the solid graph line ga1 in FIG. 8A, the weight of the differential control decreases as the frame rate decreases. As the frame rate decreases, the time between two frames becomes longer and the amount of signal change due to time differentiation becomes relatively larger, resulting in an increase in the effectiveness of the differential control. Therefore, by decreasing the weight of the differential control as the frame rate decreases, it is possible to achieve the effect of preventing oscillation phenomena in the feedback control.

As indicated by the broken graph line ga2 in FIG. 8A, the weight of the integral control increases as the frame rate decreases. As the frame rate decreases, the time between two frames becomes longer and the integral value over a predetermined time becomes relatively smaller. Accordingly, it is possible to prevent a decrease in the effectiveness of the integral control, thereby improving the control performance.

FIG. 8B shows a change in the weight according to the exposure time of the imaging element. The horizontal axis represents the exposure time for acquiring images and the vertical axis represents the weight of the integral control. As indicated by a broken graph line gb, the weight of the integral control increases as the exposure time increases. As the exposure time increases, the influence of shake of (low frequency) components with a high frequency resolution in the shake information increases. Thus, by increasing the weight of the integral control, it is possible to improve the correction performance for low frequency shake.

FIG. 8C shows a change in the weight according to the focal length. The horizontal axis represents the focal length associated with the zooming operation of the imaging apparatus and the vertical axis represents the weight of the differential control. As indicated by a solid graph line gc, the weight of the differential control increases as the focal length of the imaging optical system increases. As the focal length increases, the influence of shake of (high frequency) components with a low frequency resolution in shake information increases. Thus, by increasing the weight of the differential control, it is possible to improve the correction performance for high frequency shake. In the present embodiment, it is possible to improve image blur correction performance regardless of shooting conditions by changing the weight of each control element as the shooting setting changes.

Second Embodiment

Next, a second embodiment of the present invention will be described. The present embodiment will be described with regard to control using a phase advance compensator and a phase delay compensator instead of the PID controller of the first embodiment. In the present embodiment, the same reference numerals are used to indicate the same components as those of the first embodiment, and thus detailed descriptions thereof will be omitted and the differences will be mainly described. Such omission of the description is the same in the embodiments which will be described later.

Figure 9:
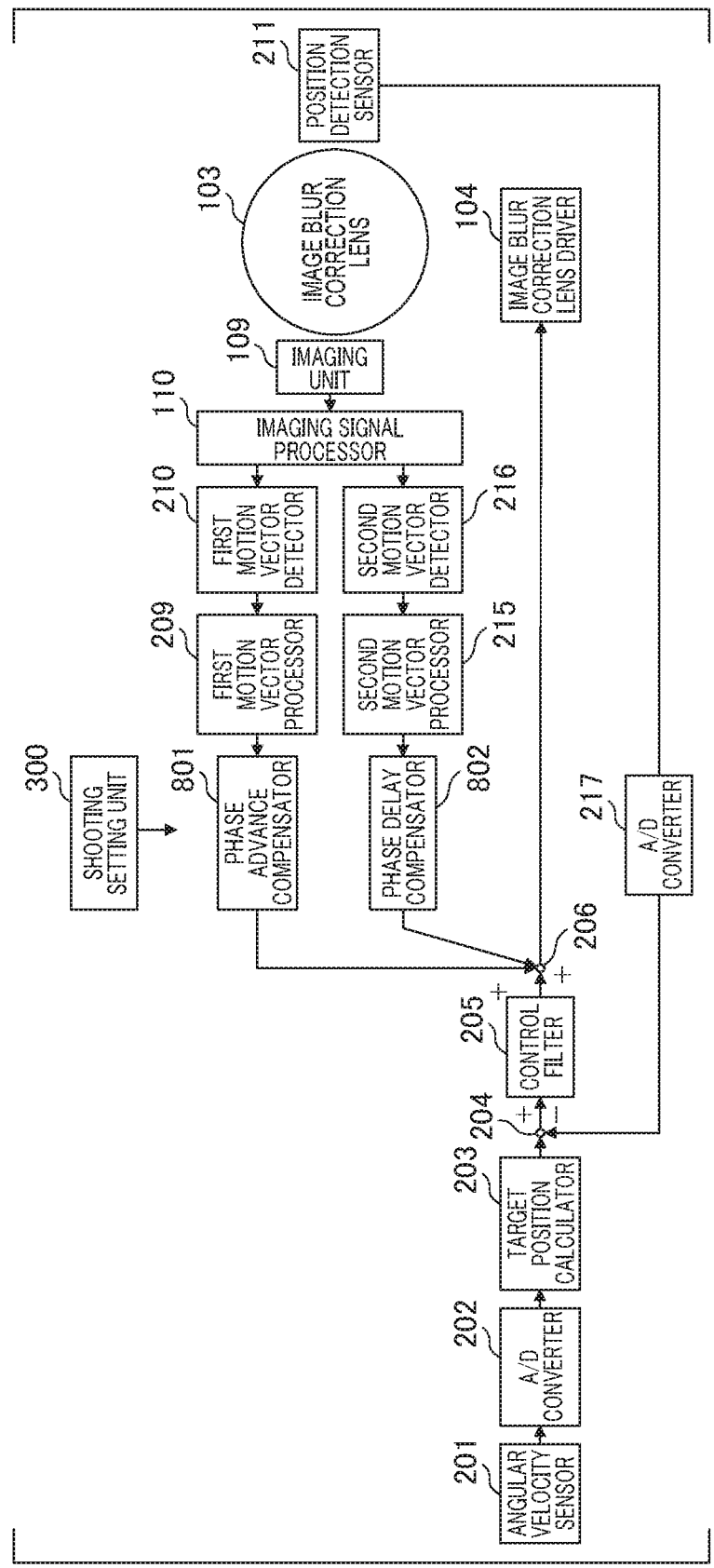
FIG. 9 is a block diagram illustrating an example configuration of an image blur correction control unit according to the second embodiment.

FIG. 9 shows an example configuration of an image blur correction control unit using a phase advance compensator and a phase delay compensator. The following are differences from FIG. 3.

The phase advance compensator 801 acquires an output of the first motion vector processor 209 and outputs the acquired output to the adder 206.

The phase delay compensator 802 acquires an output of the second motion vector processor 215 and outputs the acquired output to the adder 206.

In the present embodiment, the proportional gain unit 212 is not used and the phase advance compensator 801 is used instead of the differentiator 208 and the differential gain unit 207. In addition, the phase delay compensator 802 is used instead of the integrator 214 and the integral gain unit 213.

Figure 10:
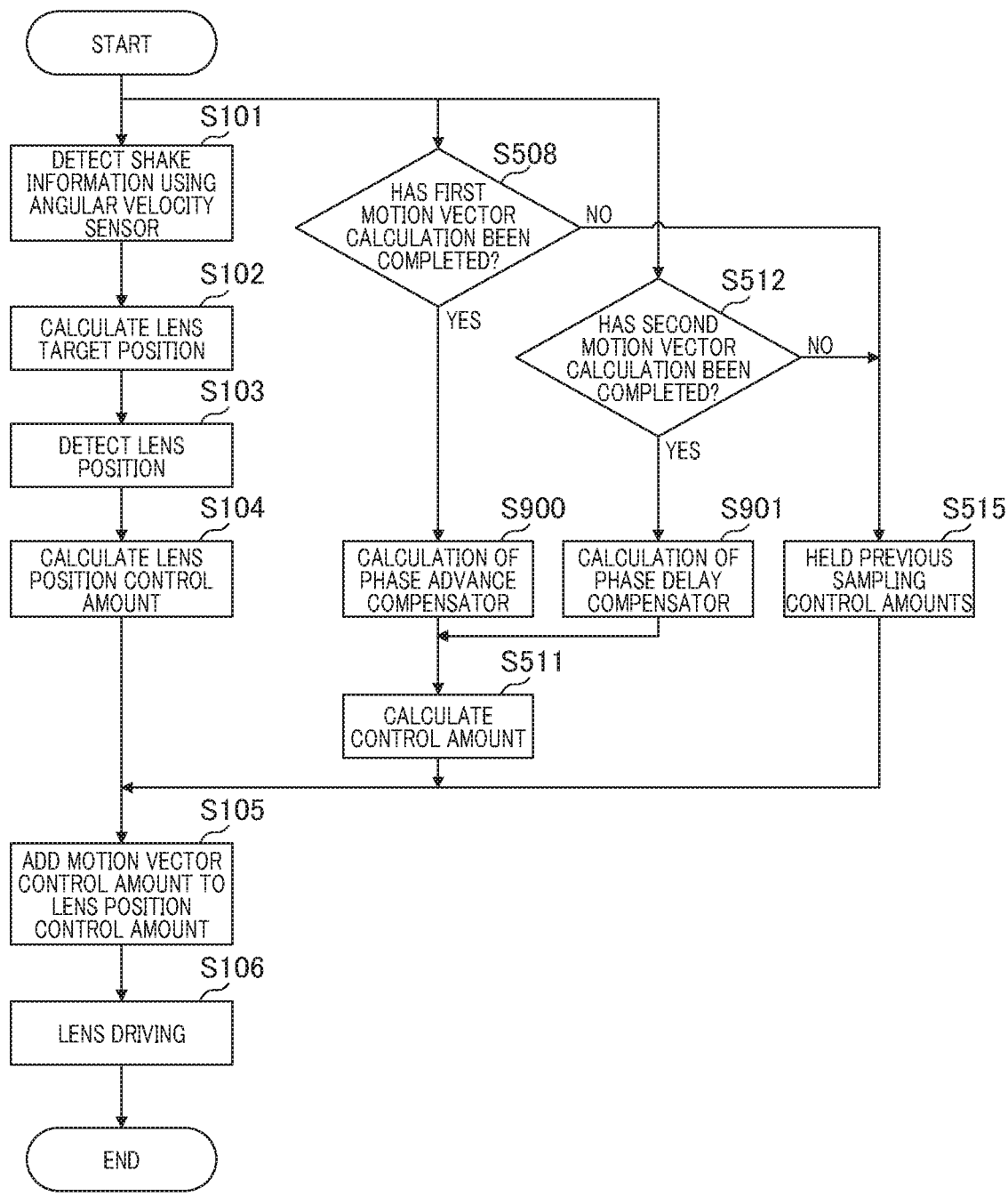
FIG. 10 is a flowchart illustrating an image blur correction control operation according to the second embodiment.

FIG. 10 is a flowchart illustrating an image blur correction operation of the present embodiment. The following are differences from FIG. 4.

Upon proceeding to step S900 from step S508, calculation of the phase advance compensator 801 is performed and then the process proceeds to step S511.

Upon proceeding to step S901 from step S512, calculation of the phase delay compensator 802 is performed and then the process proceeds to step S511.

A lack of the process of step S507.

Upon determining in step S508 that the process of calculating the first motion vector has been completed (Yes in step S508), the process proceeds to step S900. In step S900, the calculation of the phase advance compensator 801 is performed instead of the differential process and the multiplication by the differential gain. Upon determining in step S512 that the process of calculating the second motion vector has been completed (Yes in step S512), the process proceeds to step S901. In step S901, the calculation of the phase delay compensator 802 is performed instead of the integration process and the multiplication by the integral gain.

Figure 11:
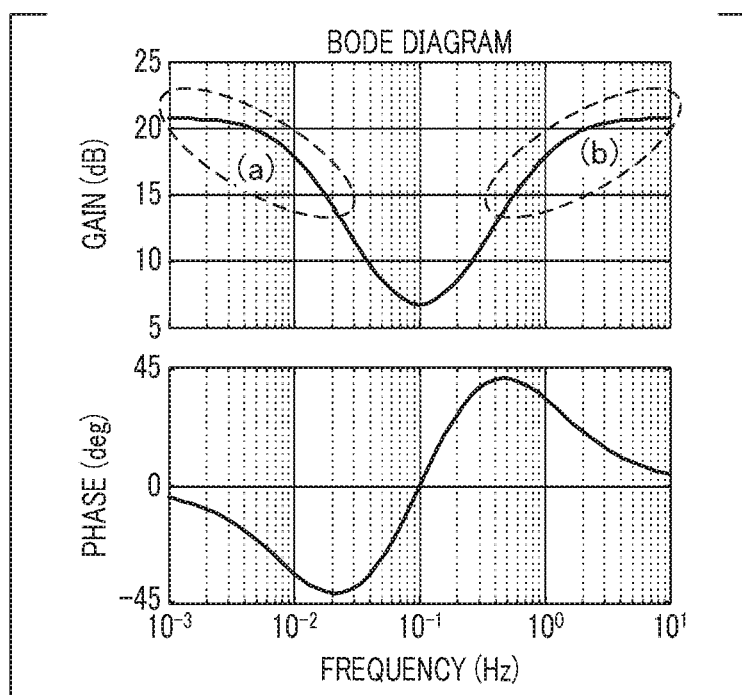
FIG. 11 is a diagram illustrating the frequency characteristics of control elements according to the second embodiment.

Advantages of the present embodiment will be described below with reference to FIG. 11. FIG. 11 is a Bode diagram showing frequency characteristics of a controller including a phase advance compensator and a phase delay compensator. The feedback control system of the present embodiment is a control system with phase advance compensation and phase delay compensation. An example of the transfer function of each control element is shown below. A variable s in equations represents a complex number. Also, a and T are design parameters and a phase advance amount and a phase delay amount are determined by setting of these parameters.

Phase advance compensator $$P_d = \frac{1 + sa_1 T}{1 + sT} \text{ where } a_1 > 1 \quad \text{(Equation 1)}$$

Phase delay compensator $$P_d = \frac{1 + sa_2 T}{1 + sT} \text{ where } a_2 < 1 \quad \text{(Equation 2)}$$

Phase advance/delay compensator $$P_c = \frac{(1 + sa_1 T)(1 + sa_2 T)}{(1 + sT)^2} \quad \text{(Equation 3)}$$

Frequency characteristics (gain characteristics) and advantages of each control element have the following features.

Phase advance compensator: Improves transient characteristics. In the frequency characteristics, the gain of (high frequency) components with a low frequency resolution is increased by a certain value relative to (low frequency) components with a high frequency resolution.

Phase delay compensator: Improves stability characteristics. In the frequency characteristics, the gain of (high frequency) components with a low frequency resolution is reduced by a certain value relative to (low frequency) components with a high frequency resolution, thereby achieving stability.

Thus, the frequency characteristics of the control with phase advance compensation and phase delay compensation including such control elements are as shown in FIG. 11.

By the phase delay compensator, it is possible to adjust the gain of the frequency domain for (low frequency) components (a) with a high frequency resolution in the shake information detected from the motion vector information.

By the phase advance compensator, it is possible to adjust the gain of the frequency domain for (high frequency) components (b) with a low frequency resolution in the shake information detected from the motion vector information.

The first motion vector information calculated from images with a low spatial resolution has a characteristic that the detection delay time of shake information is short and the reproducibility of high frequency shake information with a low frequency resolution is high. Utilizing this characteristic, the control amount is calculated by the phase advance compensator 801 having a great contribution to the high frequency gain using the first motion vector information. On the other hand, the second motion vector information calculated from images with a high spatial resolution has a characteristic that the detection delay time of shake information is long but the reproducibility of low frequency shake information with a high frequency resolution is high. Utilizing this characteristic, the control amount is calculated by the phase delay compensator 802 having a great contribution to the low frequency gain using the second motion vector information.

In the present embodiment, two pieces of shake information having different frequency resolutions are calculated using motion vector information calculated from two images having different spatial resolutions. Control elements having different degrees of contribution to the gain with respect to shake frequency are combined to calculate the control amount to perform image blur correction, thereby achieving image blur correction performance similar to the first embodiment.

The control weight change process (FIG. 5: S502) for each control element will be described below with reference back to FIGS. 8A to 8C. In the present embodiment, the solid graph line represents phase advance compensation and the broken graph line represents phase delay compensation. Changing the weight (degree of contribution) of each control element corresponds to changing the frequency characteristics of the phase advance compensator 801 and the phase delay compensator 802 according to the shooting setting condition of the shooting setting unit 300. Specifically, the weights of the control elements are changed by changing the coefficients of the transfer functions of the control elements expressed by Equations 1 to 3. Increasing the weight is to increase the amount (increment) by which the phase delay compensator 802 increases the gain in the low frequency region relative to the high frequency region and to increase the amount by which the phase advance compensator 801 increases the gain in the high frequency region relative to the low frequency region. Reducing the weight is to reduce the amount by which the phase delay compensator 802 increases the gain in the low frequency region relative to the high frequency region and to reduce the amount by which the phase advance compensator 801 increases the gain in the high frequency region relative to the low frequency region.

FIG. 8A shows a weight change of each control element with respect to a change in the frame rate of images. As indicated by the solid graph line ga1, the weight of the phase advance compensation decreases as the frame rate decreases. As the frame rate decreases, the calculation cycle of the digital control filter becomes slower, with the result that the amount of the increase of the gain in the high frequency band relative to the low frequency band is increased due to frequency characteristics for the same digital filter coefficients. Thus, by reducing the weight of the phase advance compensation, it is possible to achieve the advantage of preventing oscillation phenomena in the feedback control due to the phase advance compensation control amount. On the other hand, the weight of the phase delay compensation increases as the frame rate decreases as indicated by the broken graph line ga2. As the frame rate decreases, the calculation cycle of the digital control filter becomes slower and the amount of the increase of the gain in the low frequency band relative to the high frequency band is reduced due to frequency characteristics for the same digital filter coefficients. Thus, by increasing the weight of the phase delay compensation, it is possible to prevent a decrease in the effectiveness. This improves the control performance.

FIG. 8B shows a change in the weight of the phase delay compensation with respect to a change in the exposure time for acquiring images. As indicated by the broken graph line gb, the weight of the phase delay compensation increases as the exposure time increases. As the exposure time increases, the influence of shake of (low frequency) components with a high frequency resolution in shake information increases. Thus, by increasing the weight of the phase delay compensation control, it is possible to improve the correction performance for (low frequency) shake with a high frequency resolution.

FIG. 8C shows a change in the weight of the phase advance control with respect to a change in the focal length associated with the zooming operation of the imaging apparatus. As indicated by the solid graph line gc, the weight of the phase advance compensation control increases as the focal length increases. As the focal length increases, the influence of shake of (high frequency) components with a low frequency resolution in shake information increases. Thus, by increasing the weight of the phase advance control, it is possible to improve the correction performance for (high frequency) shake with a low frequency resolution.

According to the present embodiment, it is possible to improve the correction performance regardless of the shooting condition by changing the weight of each control element as the shooting setting changes, similar to the first embodiment.

Third Embodiment

Next, a third embodiment of the present invention will be described. The present embodiment will be described below with regard to image blur correction control using filters instead of the PID controller or the phase advance compensator and the phase delay compensator.

Figure 12:
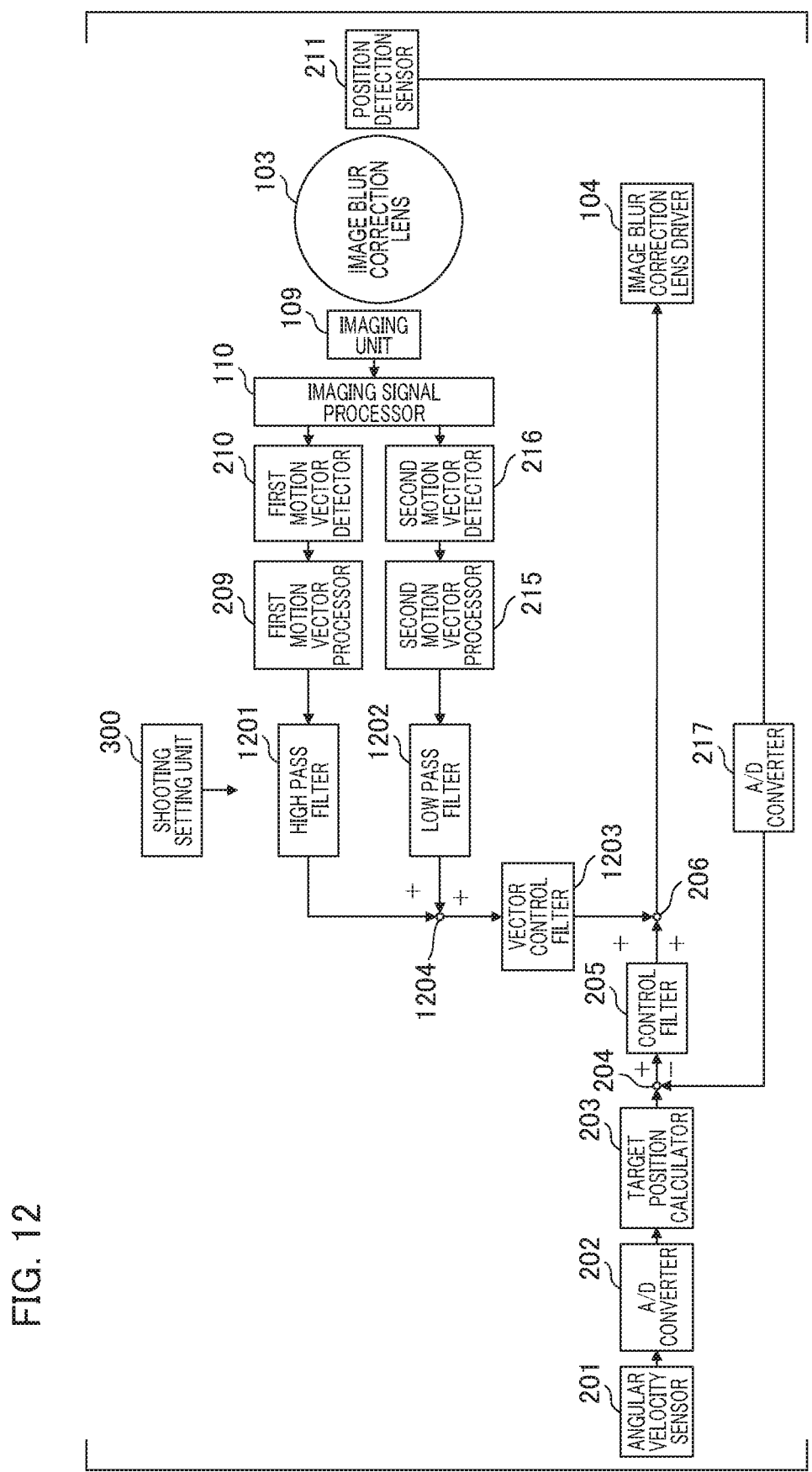
FIG. 12 is a block diagram illustrating an example configuration of an image blur correction control unit according to a third embodiment.

FIG. 12 shows an example configuration using a high pass filter 1201 and a low pass filter 1202 that extract predetermined frequency components from shake information based on motion vectors. The following are differences from FIG. 3.

The high pass filter 1201 acquires an output of the first motion vector processor 209 and outputs the acquired output to an adder 1204.

The low pass filter 1202 acquires an output of the second motion vector processor 215 and outputs the acquired output to the adder 1204.

A vector control filter 1203 processes an output of the adder 1204 and outputs the processing result to the adder 206.

In the present embodiment, the high pass filter 1201 is used instead of the differentiator 208 and the differential gain unit 207 of the first embodiment, and the proportional gain unit 212 is not used. Also, the low pass filter 1202 is used instead of the integrator 214 and the integral gain unit 213. The high pass filter 1201 and the low pass filter 1202 extract shake of different frequency bands respectively from the first and second motion vector information and then the adder 1204 sums the extracted shake. On the basis of this shake information, the vector control filter 1203 calculates a feedback control amount, and then a process of adding the calculated feedback control amount to the control amount calculated by the control filter 205 is performed. Here, the vector control filter 1203 may be configured, for example, using a controller which merely multiplies the output information of the adder 1204 by a predetermined gain value. Image blur correction control is performed by adding the feedback control amount to a target position of the correction lens 103 for a shake detected by the angular velocity sensor 201.

Figure 13:
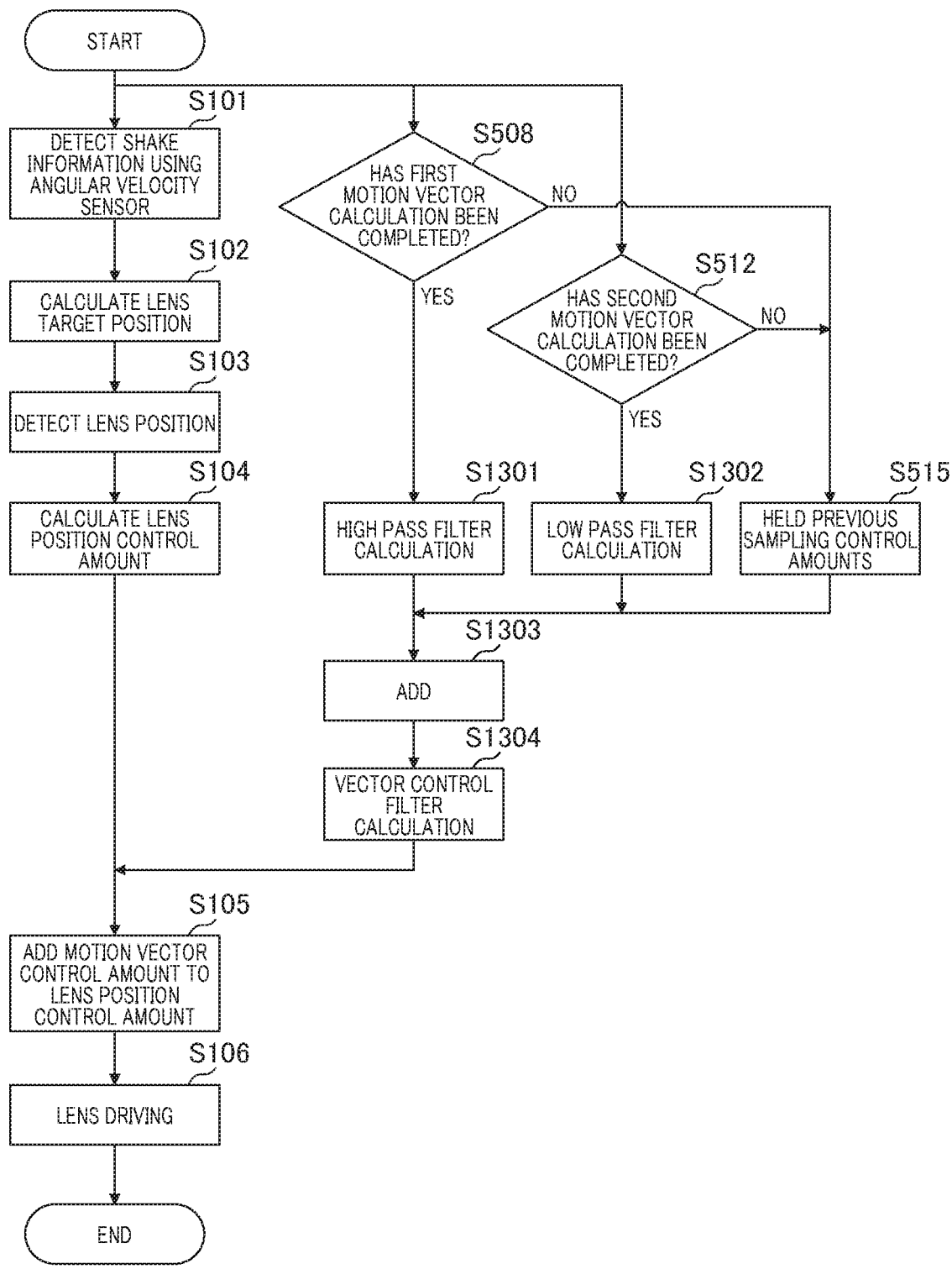
FIG. 13 is a flowchart illustrating an image blur correction control operation according to the third embodiment.

FIG. 13 is a flowchart illustrating the image blur correction operation of the present embodiment. If it is determined in step S508 that the first motion vector calculation process has been completed (Yes in step S508), the high pass filter 1201 extracts (high frequency) components with a low frequency resolution in step S1301. If it is determined in step S512 that the second motion vector calculation process has been completed (Yes in step S512), the low pass filter 1202 extracts (low frequency) components with a high frequency resolution in step S1302. These pieces of shake information are added by the step S1303 and then subjected to calculation of the vector control filter 1203 (step S1304). As a result, a feedback control amount for the correction lens 103 is calculated. After the process of step S1304, the process proceeds to step S105.

On the other hand, until it is determined in steps S508 and S512 that the first and second motion vectors have been calculated, the vector information of each of the first and second motion vectors is not updated and the control amount in the previous sampling is held (step S515). The feedback control amount is calculated on the basis of the shake information. After step S515, the process proceeds to step S1303.

Figure 14:
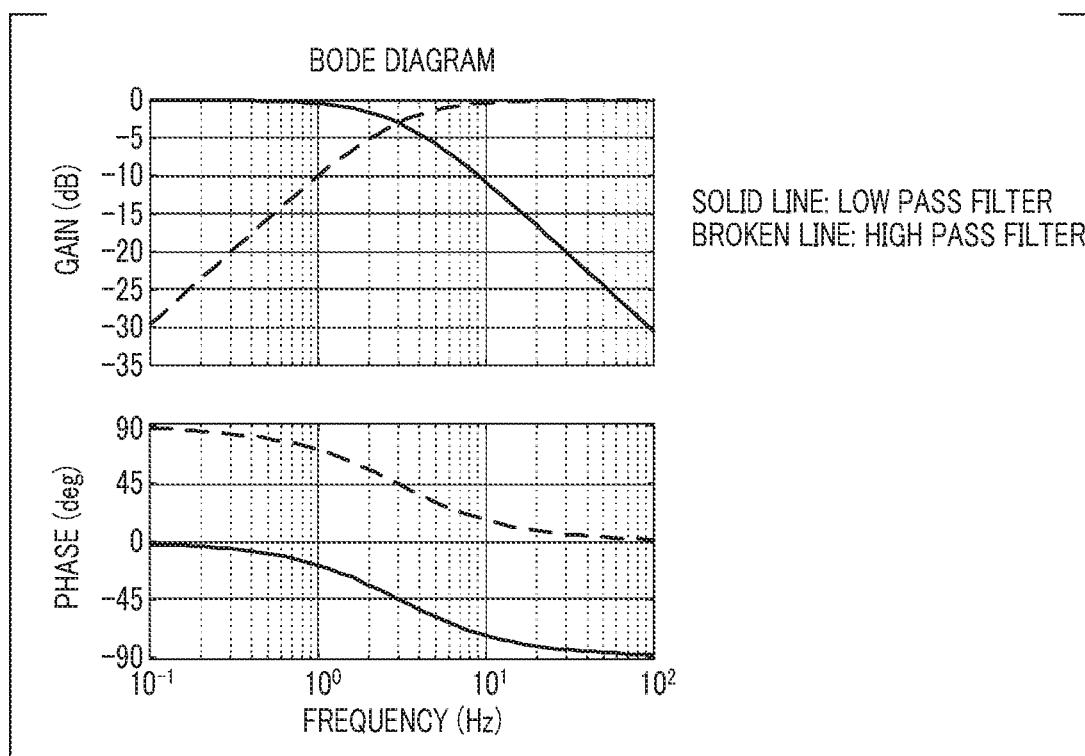
FIG. 14 is a diagram illustrating the frequency characteristics of control elements according to the third embodiment.

Frequency characteristics of the high pass filter 1201 and the low pass filter 1202 will now be described with reference to a Bode diagram of FIG. 14. FIG. 14 shows example frequency characteristics of each of the filters that extract different frequency components from motion vector information. In the gain and phase characteristics, solid graph lines show the characteristics of the low pass filter 1202 and broken graph lines show the characteristics of the high pass filter 1201. An example mathematical expression of the transfer function of each control element is shown below.

High pass filter $$P_h = \frac{sT_c}{sT_c + 1} \quad \text{(Equation 4)}$$

Low pass filter $$P_l = \frac{1}{sT_c + 1} \quad \text{(Equation 5)}$$

In Equations 4 and 5, s represents a complex number. $T_c$ is a design parameter. According to setting of these values, the cutoff frequencies of the high pass filter 1201 and the low pass filter 1202 are determined.

The first motion vector information calculated from images with a low spatial resolution has a characteristic that the detection delay time of shake information is short and the reproducibility of high frequency shake information with a low frequency resolution is high. Utilizing this characteristic, components (in a high frequency band) with a low frequency resolution are extracted from the first motion vector information using the high pass filter 1201. On the other hand, the second motion vector information calculated from images with a high spatial resolution has a characteristic that the detection delay time of shake information is long but the reproducibility of low frequency shake information with a high frequency resolution is high. Utilizing this characteristic, components (in a low frequency band) with a high frequency resolution are extracted from the second motion vector information using the low pass filter 1202. Combining the extracted components makes it possible to acquire shake information with high detection accuracy for all frequencies.

A process for calculating two pieces of shake information having different frequency resolutions using motion vector information calculated from two images having different spatial resolutions is performed as described above. Then, with the calculated shake information, control elements having different degrees of contribution to the gain with respect to shake frequency are combined to calculate a control amount, thereby achieving the same advantages as those of the first embodiment. That is, it is possible to achieve both a reduction in the detection delay time for calculation of motion vector information and an increase in the detection accuracy of shake information with different frequency resolutions, thereby improving the image blur correction performance.

Figure 15A:
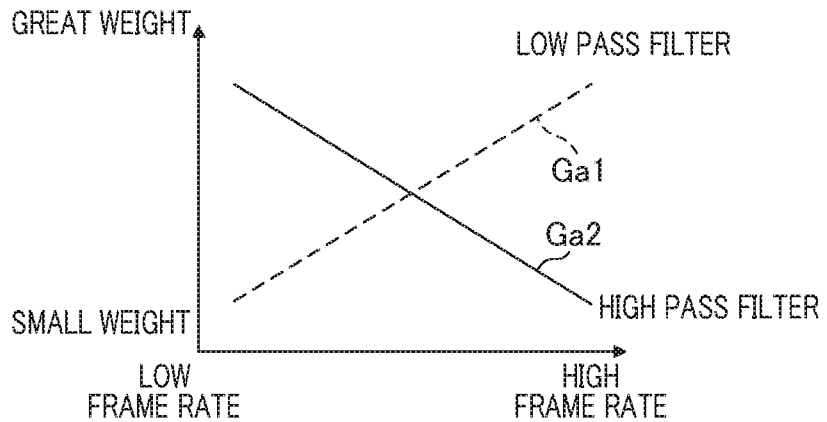
FIGS. 15A to 15C are diagrams illustrating a weight change of each control element according to the third embodiment.
Figure 15B:
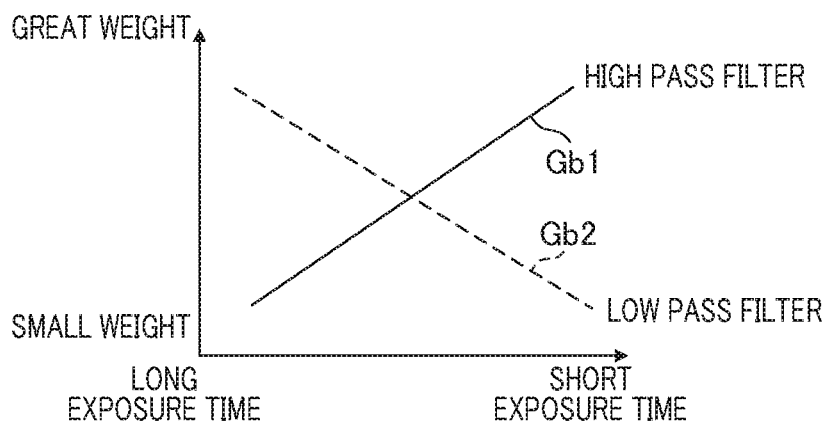
Figure 15C:
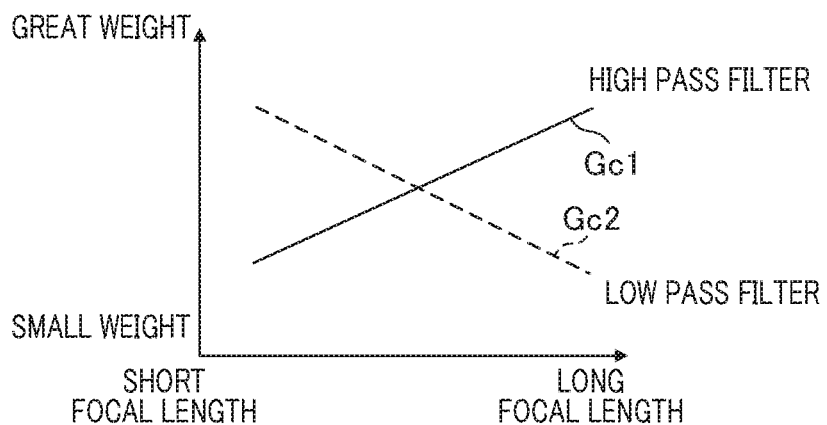

Next, the control weight change process (FIG. 5: S502) in the present embodiment will be described with reference to FIGS. 15A to 15C. FIGS. 15A to 15C are diagrams showing the relationship between weight changes of the filters with respect to the shooting setting condition. The setting of the horizontal axis and the vertical axis is similar to FIGS. 8A to 8C. In the present embodiment, changing the weight (degree of contribution) of each filter corresponds to changing the cutoff frequencies of the high pass filter 1201 and the low pass filter 1202 according to the shooting setting condition of the shooting setting unit 300. Specifically, the coefficients of the transfer functions of the filters shown in Equation 4 and Equation 5 are changed. Increasing the weight of the low pass filter 1202 is to change the cutoff frequency thereof to a higher frequency and reducing the weight is to change the cutoff frequency to a lower frequency. On the other hand, increasing the weight of the high pass filter 1201 is to change the cutoff frequency thereof to a lower frequency and reducing the weight is to change the cutoff frequency to a higher frequency.

FIG. 15A shows a weight change of each filter with respect to a change in the frame rate of images. As indicated by a broken graph line Ga1, the weight of the low pass filter 1202 increases as the frame rate increases. On the other hand, as indicated by a solid graph line Ga2, the weight of the high pass filter 1201 decreases as the frame rate increases. As the frame rate increases, the sampling time for motion vector detection becomes shorter, thus alleviating the influence of the phase delay due to the sampling hold time. For this reason, the reproducibility of components (in a high frequency band) with a low frequency resolution having high detection accuracy, which are calculated from the second motion vector, is improved as compared to that of the first motion vector. Therefore, the image blur correction performance is improved by using the second motion vector information in a wider band than the first motion vector information.

FIG. 15B shows a weight change of each filter with respect to a change in the exposure time for acquiring images. As indicated by a solid graph line Gb1, the weight of the high pass filter 1201 decreases as the exposure time increases. As indicated by a broken graph line Gb2, the weight of the low pass filter 1202 increases as the exposure time increases. As the exposure time increases, the influence of shake of (low frequency) components with a high frequency resolution in shake information increases. Therefore, the image blur correction performance is improved by using the second motion vector information with high detection accuracy in a wider band than the first motion vector information.

FIG. 15C shows a weight change of each filter with respect to a change in the focal length associated with the zooming operation of the imaging apparatus. As indicated by a solid graph line Gc1, the weight of the high pass filter 1201 increases as the focal length increases. As indicated by a broken graph line Gc2, the weight of the low pass filter 1202 decreases as the focal length increases. As the focal length increases, the influence of shake of (high frequency) components with a low frequency resolution in shake information increases. Therefore, by using the first motion vector information in a wider band than the second motion vector information, it is possible to improve the correction performance for (high frequency) shake with a low frequency resolution.

In the present embodiment, by changing the weight of each control element according to the shooting setting, it is possible to improve the correction performance regardless of the shooting condition, similar to the first embodiment.

According to the above embodiments, a plurality of shake information having different frequency resolutions are calculated from motion vector information calculated using a plurality of images having different spatial resolutions and image blur correction is performed on the basis of the shake information, whereby it is possible to improve the image blur correction performance. Although examples of the image blur correction operation by drive control of the correction lens 103 which is a movable optical member have been described in each of the embodiments, the present invention may be implemented with a configuration in which the image blur correction operation is performed by controlling the movement of the imaging element or may be implemented with a configuration combining these two schemes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-156521, filed Aug. 14, 2017 which is hereby incorporated by reference wherein in its entirety.

What is claimed is:

1. An image blur correction apparatus comprising:
at least one processor and at least one memory functioning as:
a generation unit configured to generate a first image having a first resolution and a second image having a second resolution different from the first resolution on the basis of an input image;
a first detection unit configured to detect first motion vector information on the basis of a plurality of the first images generated by the generation unit;
a second detection unit configured to detect second motion vector information on the basis of a plurality of the second images generated by the generation unit, wherein a process of detecting the second motion vector information is performed in parallel with a process of detecting the first motion vector information; and
a calculation unit configured to calculate a control amount for an image blur correction unit on the basis of the first motion vector information and the second motion vector information.

2. The image blur correction apparatus according to claim 1, wherein the calculation unit calculates a plurality of control amounts whose weights based on a frequency resolution corresponding to the number of sampling points per cycle are different with respect to frequency components of the first motion vector information and the second motion vector information.

3. The image blur correction apparatus according to claim 2, wherein the first resolution is lower than the second resolution, and
wherein the calculation unit is configured calculates a first control amount through differential control and to calculate a second control amount through integral control when the calculation unit calculates the first and second control amounts whose weights based on the frequency resolution are different with respect to the frequency components of the first and second motion vector information.

4. The image blur correction apparatus according to claim 3, wherein the calculation unit calculates the first control amount having a great weight for information with a low frequency resolution with respect to the frequency components of the first motion vector information and the second control amount having a great weight for information with a high frequency resolution with respect to the frequency components of the second motion vector information.

5. The image blur correction apparatus according to claim 3, wherein the calculation unit calculates a third control amount through multiplication by a weight regardless of the frequency resolution with respect to frequency components of the first or second motion vector information and calculates the control amount for the image blur correction unit on the basis of the second control amount and one or both of the first and third control amounts.

6. The image blur correction apparatus according to claim 3, wherein the calculation unit calculates the first control amount from a difference between the currently calculated first motion vector information and the previously calculated first motion vector information.

7. The image blur correction apparatus according to claim 5, wherein the calculation unit calculates the third control amount through proportional control which multiplies the first motion vector information by a gain value.

8. The image blur correction apparatus according to claim 1, wherein the calculation unit calculates a first control amount through phase advance compensation control for the first motion vector information, calculates a second control amount through phase delay compensation control for the second motion vector information, and calculates the control amount for the image blur correction unit on the basis of the first and second control amounts.

9. The image blur correction apparatus according to claim 8, wherein the calculation unit performs processing to change weights of the first and second control amounts according to a shooting setting condition.

10. The image blur correction apparatus according to claim 9, wherein the calculation unit decreases the weight of the first control amount as a frame rate of images is delayed.

11. The image blur correction apparatus according to claim 9, wherein the calculation unit increases the weight of the second control amount as a frame rate of images is delayed.

12. The image blur correction apparatus according to claim 9, wherein the calculation unit increases the weight of the second control amount as an exposure time of an imaging unit increases.

13. The image blur correction apparatus according to claim 9, wherein the calculation unit increases the weight of the first control amount as a focal length of an imaging optical system increases.

14. The image blur correction apparatus according to claim 1, wherein the calculation unit calculates a first control amount on the basis of first shake information extracted from the first motion vector information and calculates a second control amount on the basis of second shake information extracted from the second motion vector information.

15. The image blur correction apparatus according to claim 14, further comprising an extraction unit including:
   a first filter configured to extract the first shake information having a great weight for information having a low frequency resolution corresponding to the number of sampling points per cycle with respect to frequency components of the first motion vector information; and
   a second filter configured to extract the second shake information having a great weight for information having a high frequency resolution with respect to frequency components of the second motion vector information.

16. The image blur correction apparatus according to claim 15, wherein the first filter is a high pass filter and the second filter is a low pass filter.

17. The image blur correction apparatus according to claim 16, further comprising:
   a control unit configured to change cutoff frequencies of the first and second filters.

18. The image blur correction apparatus according to claim 17, wherein the control unit performs processing to increase the weight of the first control amount by changing the cutoff frequency of the first filter to a lower frequency and to decrease the weight of the first control amount by changing the cutoff frequency of the first filter to a higher frequency, and wherein the control unit performs processing to increase the weight of the second control amount by changing the cutoff frequency of the second filter to the higher frequency and to decrease the weight of the second control amount by changing the cutoff frequency of the second filter to the lower frequency.

19. The image blur correction apparatus according to claim 18, wherein the control unit decreases the weight of the first control amount as a frame rate of images increases and increases the weight of the second control amount as the frame rate increases.

20. The image blur correction apparatus according to claim 18, wherein the control unit decreases the weight of the first control amount as an exposure time of an imaging unit increases and increases the weight of the second control amount as the exposure time of the imaging unit increases.

21. The image blur correction apparatus according to claim 18, wherein the control unit increases the weight of the first control amount as a focal length of an imaging optical system increases and decreases the weight of the second control amount as the focal length increases.

22. The image blur correction apparatus according to claim 1, wherein the image blur correction unit performs image blur correction through movement of an imaging unit or an optical member of an imaging optical system.

23. A control method performed for an image blur correction apparatus, the control method comprising:
   generating a first image having a first resolution and a second image having a second resolution different from the first resolution on the basis of an input image;
   detecting first motion vector information on the basis of a plurality of the first images generated in the generation process;
   detecting second motion vector information on the basis of a plurality of the second images generated in the generation process, wherein detecting the second motion vector information is performed in parallel with detecting the first motion vector information; and calculating a control amount for an image blur correction unit on the basis of the first motion vector information and the second motion vector information.

* * * * *